United States Patent [19]

Kalfoglou

[11] 4,231,427

[45] Nov. 4, 1980

[54] SURFACTANT WATERFLOODING OIL RECOVERY METHOD

[75] Inventor: George Kalfoglou, Houston, Tex.

[73] Assignee: Texaco Inc., White Plains, N.Y.

[21] Appl. No.: 969,919

[22] Filed: Dec. 15, 1978

[51] Int. Cl.$^2$ .............................................. E21B 43/22
[52] U.S. Cl. .............................. 166/275; 252/8.55 D
[58] Field of Search ................ 166/273, 274, 275; 252/8.55 D

[56] References Cited

U.S. PATENT DOCUMENTS

| | | | |
|---|---|---|---|
| 3,373,809 | 3/1968 | Cooke, Jr. | 166/273 |
| 3,506,070 | 4/1970 | Jones | 166/273 |
| 3,637,017 | 1/1972 | Gale et al. | 166/273 |
| 4,018,278 | 4/1977 | Shupe | 166/274 X |
| 4,077,471 | 3/1978 | Shupe et al. | 166/275 |
| 4,088,189 | 5/1978 | Shupe | 166/273 X |
| 4,110,228 | 8/1978 | Tyler et al. | 166/273 X |
| 4,110,229 | 8/1978 | Carlin et al. | 166/273 X |
| 4,120,358 | 10/1978 | Kalfoglou | 166/275 |

Primary Examiner—Stephen J. Novosad
Assistant Examiner—George A. Suchfield
Attorney, Agent, or Firm—C. G. Ries; Robert A. Kulason; Jack H. Park

[57] ABSTRACT

Disclosed is a novel surfactant fluid and an oil recovery method using the fluid for recovering oil from subterranean formations thereof by surfactant waterflooding process. The fluid comprises an alkylpolyalkoxyalkylene sulfonate or an alkylarylpolyalkoxyalkylene sulfonate and a stabilizing agent comprising a synergistic mixture of an alkanol and an alkyl phenol. The presence of the mixture of alkanol and phenol improves the phase stability of the fluid, increases the viscosity of the surfactant fluid, and reduces the adsorption of surfactant by the formation.

14 Claims, No Drawings

SURFACTANT WATERFLOODING OIL RECOVERY METHOD

FIELD OF THE INVENTION

This invention concerns a surfactant waterflood oil recovery method.

BACKGROUND OF THE INVENTION

Petroleum may be recovered from subterranean, petroleum-containing formations by penetrating the formation with one or more wells and pumping or permitting petroleum to flow to the surface through these wells, only if certain conditions exist in the formation. The petroleum must be present in an adequately high concentration in the formation, and there must be sufficient permeability or interconnected flow channels within the formation to permit the flow of fluids therethrough if sufficient pressure is applied to the fluid. When the formation has natural energy present in the form of an underlying active water drive, gas dissolves in the petroleum which can exert pressure to drive the petroleum to the producing well, or a high pressure gas cap above the petroleum saturated formation, this natural energy is ordinarily utilized to recover petroleum in what is commonly referred to as primary recovery. When this natural energy source is depleted, or in the instance of those formations which do not contain sufficient natural energy within the formation to allow primary recovery, some form of supplemental recovery process or enhanced recovery process must be applied to the formation in order to extract additional petroleum therefrom. Supplemental recovery is sometimes referred to as secondary recovery or tertiary recovery, although in fact it may be primary, secondary or tertiary in sequence of employment.

The most commonly employed form of supplemental recovery is waterflooding, which comprises injecting water into the subterranean, petroleum-containing formation to displace petroleum toward a producing well from which it is recovered to the surface of the earth. While waterflooding is successful and economical, water does not displace petroleum efficiently, and therefore a substantial amount of petroleum remains in the formation after conclusion of waterflooding. This has been well recognized in the literature pertaining to oil recovery methods, and there are many prior art references suggesting incorporating surface active agents or surfactants in the flood water for the purpose of reducing the interfacial tension between the injected water and the formation petroleum, which accomplishes recovery of a greater portion of the residual oil after primary production than is possible with waterflooding.

Petroleum sulfonate and other organic sulfonates, as well as organic sulfates, have been proposed in many prior art references for surfactant waterflooding. While these materials are inexpensive and effective under ideal conditions, they are very sensitive to formation water salinity, and cannot be used safely in formations containing water whose salinity exceeds about 30,000 parts per million total dissolved solids. Alkylpolyethoxy sulfates and alkylarylpolyethoxy sulfates are proposed for surfactant waterflooding in other prior art references. While these materials are effective in high salinity environments, they are not stable at temperatures in excess of about 150° F. due to hydrolysis of the sulfate, and so their use is restricted to high salinity, low temperature formations.

U.S. Pat. Nos. 3,827,497; 3,890,239; and 3,977,471 describe surfactant waterflooding oil recovery processes using alkylpolyalkoxyalkylene sulfonate or alkylarylpolyalkoxyalkylene sulfonates, and recognize that these surfactants are stable at temperatures as high as 240° F. and tolerant of salinities as high as 220,000 parts per million total dissolved solids.

Despite encouraging laboratory results, field use of surfactant waterflooding methods employing alkylpolyalkoxyalkylene sulfonates or alkylarylpolyalkoxyalkylene sulfonate has been less successful than expected based on laboratory results, and several possible reasons are proposed for the field results being less than expected. Saline, aqueous fluids containing alkylpolyalkoxyalkylene sulfonates or alkylarylpolyalkoxyalkylene sulfonates exhibit unexpected phase instability, which causes rapid loss of low surface tension oil displacing ability of the fluid. Adsorption of the surfactant from aqueous solution is a serious problem as it is in the use of most anionic surfactants, and the high salinity environment for which it is most suitable renders most of the sacrificial agents suitable for use in surfactant waterflooding to decrease surfactant adsorption unusable. Moreover, there is a need to increase the viscosity of the surfactant fluid to increase the displacement efficiency of the oil displacing fluid, and there has been observed an interaction between certain hydrophilic polymers commonly used for viscous waterflooding and the alkyl or alkylarylpolyalkoxyalkylene sulfonate surfactants which degrades oil recovery.

In view of the foregoing discussion, it can be appreciated that there is a substantial need for an improved surfactant waterflooding oil recovery method suitable for use in high salinity, high temperature formations, employing an alkylarylpolyalkoxyalkylene sulfonate or alkylpolyalkoxyalkylene sulfonate, which avoids at least some of the foregoing problems. At least some of these needs will be met by certain preferred embodiments of the invention to be described more fully hereinbelow.

PRIOR ART

U.S. Pat. No. 4,077,471 recognizes the phase instability problem encountered in using aqueous fluids containing an alkylpolyalkoxyalkylene sulfonates or alkylarylpolyalkoxyalkylene sulfonates for surfactant waterflooding, and teaches that the problem may be overcome by employing, in combination with the aforementioned surfactant, a low HLB water insoluble nonionic surfactant, which is an ethoxylated alkanol or an ethoxylated alkylphenol.

SUMMARY OF THE INVENTION

This invention concerns a surfactant waterflooding oil recovery process suitable for use in formations whose temperatures are in the range from 70° F. to 300° F., which formations may also contain water having high salinity and/or hard saline water, e.g. water whose salinity is in the range of from 70,000 to 220,000 parts per million total dissolved solids and which may include divalent ions such as calcium and magnesium greater than 2,000 parts per million up to about 20,000 parts per million. Improvements in the fluid properties include increased viscosity, improved phase stability, and reduced adsorption of the surfactant from the aqueous fluid. The fluid contains, in addition to the aforementioned surfactant, which may be used alone or in combination with an organic sulfonate such as petroleum sulfonate, or a low HLB water insoluble nonionic surfactant such as an ethoxylated alkanol or an ethoxylated alkylphenol, a synergistic mixture of an alkanol and a phenol. Specifically, the stabilizing composition comprises a synergistic mixture of (1) an alkanol having the following formula:

ROH wherein R is a linear or branched alkyl group having from 1 to 8 and preferably 2 to 6 carbon atoms, and (2) a phenol having the following formula:

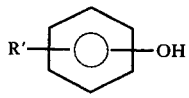

wherein R' is hydrogen or a linear or branched alkyl having from 1 to 8 and preferably from 1 to 6 carbon atoms. The ratio of the alkanol to the phenol is from 0.1 to 5 and preferably from 0.5 to 2. The concentration of the alkanolphenol mixture in the surfactant fluid is from 0.1 to 10 and preferably from 0.5 to 5 percent by weight. The ratio of the concentration of the mixture of alkanol and phenol to surfactant concentration is from 0.1 to 10 and preferably from 0.5 to 5.

DESCRIPTION OF THE PREFERRED EMBODIMENTS

This invention concerns a surfactant waterflooding oil recovery process and particularly a surfactant waterflooding process suitable for use in high temperature formations containing high salinity water. The surfactant fluid contains at least one surfactant which is an alkylpolyalkoxyalkylene sulfonate or alkylarylpolyalkoxyalkylene sulfonate having the following formula:

$$RO(R'O)_nR''SO_3^-X^+$$

wherein R is an alkyl group, linear or branched, having from 8 to 24 and preferably 10 to 20 carbon atoms, or an alkylaryl such as benzene or toluene having attached thereto at least one linear or branched alkyl group having from 6 to 20 and preferably from 8 to 18 carbon atoms, R' is ethylene or a mixture of ethylene and propylene with relatively more ethylene than propylene, n is a number from 1 to 20 preferably from 2 to 10, R" is ethylene, propylene, hydroxypropylene, or butylene and M+ is a monovalent cation such as ammonium or a monovalent metallic cation, preferably sodium, potassium or lithium. For example, a preferred surfactant within this group is one in which R is an alkyl having 12 carbon atoms, R' is ethylene, n is 4, R" is ethylene, and M+ is sodium. The concentration of this surfactant is generally in the range of from about 0.05 to about 10 and preferably from 0.1 to 5.0. The salinity of the surfactant fluid is generally from 60 to 120 percent of the salinity of the water present in the formation. The surfactant is tailored in a particular application by varying the value of n in the above formula, to ensure that the surfactant is slightly soluble in a fluid having a salinity about equal to the salinity of the water present in the formation, and accomplishes reduction in the interfacial tension between oil and water to a value less than $3 \times 10^{-2}$ dynes per centimeter, in order to ensure that it will perform as desired to accomplish low surface tension displacement of petroleum.

The above surfactant may be used as the only surfactant present in significant quantities in the fluid, or it may be used in combination with an organic sulfonate. Petroleum sulfonates having a median equivalent weight between 300 and 500 and preferably from 350 to 450 are preferred organic sulfonates for this purpose. Alkyl or alkylaryl sulfonates having from 8 to 24 carbon atoms in the alkyl chain are also suitable for use. When this embodiment is employed, the concentration of organic sulfonate is ordinarily from about 0.1 to about 10.0 and preferably from about 0.5 to about 6.0 percent by weight.

The surfactant fluid may also contain from 0.05 to 10.0 and preferably from 0.1 to 5.0 percent by weight of a low HLB water insoluble nonionic surfactant, specifically a polyethoxylated alkanol or alkylphenol, with a number of ethoxy units being selected so as to render the surfactant insoluble at the salinity of the formation water.

In addition to the above described surfactants, the use of which is described in the prior art, the surfactant fluid contains from 0.1 to 10 and preferably from 0.5 to 5 percent by weight of a mixture of alkanol and phenols. Specifically, the stabilizing additive will comprise at least one short chain alkanol having the formula:

ROH wherein R is a linear or branched alkyl group having from 1 to 8 and preferably 2 to 5 carbon atoms, and (2) at least one phenol having the following formula:

wherein R' is hydrogen or a linear or branched alkyl group having from 1 to 8 and preferably from 1 to 6 carbon atoms. Cresols are also effective for this purpose. The ratio of the alkanol to the phenol is from 0.1 to 5 and preferably from 0.5 to 2. The concentration of the mixture in the surfactant fluid is from 0.1 to 10 and preferably from 0.5 to 5 percent by weight.

Specific alkanols which I have found to be especially suitable for this application include isopropyl alcohol, normal butyl alcohol, tertiary butyl alcohol, isopentyl, alcohol, amyl alcohol including its various isomers, and hexanol including all of its isomers. The phenols which are especially suitable for this application include phenol, methyl phenol, ethyl phenol, propyl phenol, butyl phenol, amyl phenol, and hexyl phenol, as well as cresols, the dimethyl substituted phenols.

While the use of alkanols and phenols is both known in the art, I have discovered that if the two are used in combination, in a critical ratio described herein, a synergistic result is achieved which is not obtained by the use of either material alone. The phase stability of the surfactant fluid is enhanced by incorporating the stabilizing additive mixture therein, avoiding or decreasing the tendency for the complex surfactants to partition into two or more phases, which degrades or destroys the effectiveness of the surfactant fluid for low surface tension displacement of oil. I have also discovered that when these components are added to the surfactant fluid, viscosity of the fluid increases after aging the fluid for at least several days at temperatures of at least 40° C. This means that under field use conditions, the viscosity of the fluid will increase with time as the fluid passes through the formation, provided the residence time of the fluid in the formation exceeds several days and the formation temperature exceeds 40° C. Finally, and most surprisingly, I have discovered that the presence of this synergistic mixture of alkanol and phenol greatly reduces the amount of surfactant which is lost from the surfactant fluid to the formation mineral matrix as a result of adsorption of the surfactant onto the mineral grain surfaces, or by other mechanisms.

The capability of this synergistic mixture of alkanol and phenol to reduce adsorption of alkylpolyalkoxyalkylene sulfonate or alkylarylpolyalkoxyalkylene sulfonate from the surfactant fluid is especially significant for several reasons. The polyalkoxylated sulfonates are expensive materials, and so loss of these materials from solution severely impacts the economics of surfactant waterflooding process employing same. Moreover, since these surfactants are specifically designed for use in high salinity environments where other surfactants are ineffective, any sacrificial agent employed for the purpose of reducing the loss of surfactant due to adsorption by the formation mineral matrix must also be tolerant of high salinity environments. Unfortunately, most of the compounds described in the prior art for use in surfactant waterflooding processes for the purpose of decreasing the amount of surfactant lost due to adsorption by the formation, cannot be used in high salinity environments, particularly in the presence of hard brines, e.g. brines containing relatively high concentrations of divalent ions such as calcium and magnesium. By contrast, the above described mixture of alkanol and phenol is quite compatible with high temperature formations containing relatively high salinity water, i.e. as high as 220,000 parts per million total dissolved solids which may include up to 20,000 parts per million divalent ions such as calcium and magnesium.

EXPERIMENTAL SECTION

The following describes the experimental work performed for the purpose of verifying the operability of the process of my invention, demonstrating the results obtained from employment thereof, and disclosing preferred embodiments of the process of my invention.

For the purpose of determining the effectiveness of a mixture of isobutyl alcohol and phenol for increasing the viscosity of an aqueous surfactant solution, a series of surfactant solutions were prepared using different concentrations of phenol and alkanol. The surfactant employed in all of these tests was dodecylbenzene tetraethoxyethylene sulfonate prepared in an aqueous fluid having salinity of 77,000 parts per million total dissolved solids. Viscosity measurements were made on freshly prepared solutions at 25° C., and then the solutions were aged at 43° C. for 72 hours and the viscosity was again determined. Viscosity measurements were made at 10 reciprocal seconds. The data are contained in Table I below.

TABLE I

| Run | Surfactant Concentration Weight Percent | Weight Percent Alcohol and Phenol | Viscosity cp at 25° C. | cp at 43° C. (aged) |
|---|---|---|---|---|
| 1 | 1.0% | 1.5% phenol 1.2% isobutyl alcohol | 5.7 | 4.8 |
| 2 | 2.0% | 0.0% phenol 0.0% isobutyl alcohol | 1.5 | — |
| 3 | 2.0% | 1.2% phenol 0.0% isobutyl alcohol | 2.9 | — |
| 4 | 2.0% | 1.5% phenol 1.2% isobutyl alcohol | 7.5 | 21.0 |
| 5 | 3.0% | 0.0% phenol 0.0% isobutyl alcohol | 2.0 | — |
| 6 | 3.0% | 1.5% phenol 0.0% isobutyl alcohol | 6.8 | — |
| 7 | 3.0% | 0.0% phenol 1.0% isobutyl alcohol | 12.0 | — |
| 8 | 3.0% | 1.5% phenol 1.2% isobutyl alcohol | 21.0 | 68.0 |

It can be seen from the data in Table I above, the significant increase in viscosity after aging for all of the samples containing the mixture of phenol and isobutyl alcohol.

Another series of tests were performed to determine the effectiveness of the phenol-alkanol mixture for reducing the amount of surfactant adsorbed from an aqueous solution by earth formation minerals. The surfactant fluid employed in these tests was one containing as the sole surface active agent, sodium dodecylbenzene tetraethoxyethylene sulfonate. The concentration of phenol was maintained constant at a value of 17 kg/m$^3$ (1.7 percent by weight), which is the concentration at which maximum viscosity was obtained, and the concentration of isobutyl alcohol was varied. When isobutyl alcohol was added to the solution in excess of the amount causing the maximum viscosity, the viscosity of the overall system was reduced, illustrating the synergistic nature of the results obtained from the proper mixture. It is believed that the phenol and isobutyl alcohol combination affects the micro-structure of the systems, particularly the micelles formed by the surfactant in the aqueous medium.

It has been determined that optimum performance of the mixture of alkanol and phenol causes the fluid to exhibit birefringence, and the higher the intensity of the birefringence the less adsorption was observed from the system. Increasing concentrations of isobutyl alcohol generally increase the intensity of the birefringence exhibited by the system, up to a maximum value. If the total amount of phenol and isobutyl alcohol systems exceed the critical level, phase separation can be induced in the system.

A series of shake bottle tests were performed to measure the amount of dodecylbenzene tetraethoxyethylene sulfonate adsorbed by precipitated calcium carbonate at a salinity value of 77 kg/m$^3$ (77,000 parts per million) total dissolved solids, at 43° C. The data are listed in Table II below.

TABLE II

| Run | Weight Percent Surfactant | Phenol | IBA | mg Surfactant Adsorbed per Gram CaCO₃ |
|---|---|---|---|---|
| 9 | 2.0 | 1.0 | — | 26.8 |
| 10 | 2.0 | 1.7 | — | 16.1 |
| 11 | 2.0 | 1.7 | .8 | 14.5 |
| 12 | 2.0 | 1.7 | 1.6 | 12.1 |
| 13 | 3.0 | 1.7 | — | 19.6 |
| 14 | 3.0 | 1.7 | 1.0 | 11.3 |
| 15 | 3.0 | 1.7 | 2.0 | 10.7 |

It was observed that the greater the intensity of the birefringence exhibited by the single surfactant system containing the varying amounts of phenol and IBA, the less adsorption of surfactant occurred. It can be seen that the least adsorption in each instance in those systems containing both isobutyl alcohol and phenol, and the use of near equal amounts of phenol and isobutyl alcohol resulted in there being less surfactant adsorbed from the higher concentration fluid (Run 15) than was observed in Run 12 employing only 2.0 percent (20 kg/m³) of surfactant. This clearly indicates that the ratio between surfactant and total amount of the mixture of phenol and isobutyl alcohol is important as well as the ratio between phenol and isobutyl alcohol.

Two core floods were performed to confirm that the benefits observed in the above-described experiments would be reflected in improved oil recovery efficiency. Two constant rate oil displacement tests were performed at 43° C. in a core measuring 17.5 centimeters in length and 5.08 centimeters in diameter. The porosity was 20.5% and the permeability was 20.6 millidarcies. The pore volume was 72.9 cm³. In each run the core was saturated with oil and waterflooded to a constant So (oil saturation) value, after which the surfactant fluid was injected. The surfactant used was dodecyltetraethoxyethylene sulfonate. The surfactant fluid in run 16 contained 1.1% of the surfactant and no alcohol. The surfactant fluid of run 17 contained 2.0 percent surfactant, 1.7% phenol and 1.6% isobutyl alcohol. While runs 16 and 17 differed slightly in surfactant concentration, the product of pore volume and concentration was equivalent for the two runs, so they are considered comparable. The data are contained in Table III below.

TABLE III

OIL RECOVERY CORE DISPLACEMENT TEST

| Run | Surfactant Concentration Weight Percent | Pore Volumes of Surfactant | (PV) × °C. | % of Oil Recovered |
|---|---|---|---|---|
| 16 | 1.1 | 3.14 | 3.4 | 69 |
| 17 | 2.0 | 2.0 | 4.0 | 92 |

It can be seen from the above data that run 17, which incorporates the process and fluid of my invention, recovered 92 percent of the tertiary oil compared to only 69 percent for the equivalent system without the alkanol-phenol mixture, a very significant improvement.

The foregoing disclosure and data clearly indicate that the viscosity of the aqueous fluid containing an alkyl- or alkylarylpolyalkoxyalkylene sulfonate surfactant can be increased by including in that fluid, a mixture of alkanol and phenol at a critical ratio. In addition to this highly beneficial result, the adsorption of surfactant from this solution is greatly decreased as a result of the mixture of phenol and isobutyl alcohol being present in the surfactant solution. This is especially significant in applying the surfactant waterflooding processes to formations containing high salinity, especially hard, saline formation brines which cause precipitation of other materials described in the literature for preventing adsorption of surfactant from an aqueous solution. Finally, the phase stability of the solution is improved so long as the ratio of alkanol to phenol and the ratio of the mixture of alkanol and phenol to surfactant, is held within the stated ranges.

While my invention has been disclosed in terms of a number of illustrative embodiments, it is not so limited since many variations thereof will be apparent to persons skilled in the art of oil recovery without departing from the true spirit and scope of my invention. It is my desire and intention that my invention be limited and restricted only by those limitations and restrictions appearing in the claims appended immediately hereinafterbelow.

I claim:

1. A method for recovering petroleum from a subterranean, permeable, petroleum-containing formation penetrated by at least one injection well and by at least one production well, by a surfactant waterflooding method comprising injecting an aqueous surfactant-containing fluid into the formation via the injection well, said surfactant comprising an alkylpolyalkoxyalkylene sulfonate or an alkylarylpolyalkoxyalkylene sulfonate, said fluid displacing petroleum through the formation to the producing well where it is recovered to the surface of the earth, where the improvement for increasing the viscosity and phase stability of the aqueous surfactant fluid, and decreasing the amount of surfactant retained by the formation, comprises:

incorporating in the surfactant fluid, an effective amount of a mixture of a $C_1$ to $C_8$ alkanol and a phenol having the following formula:

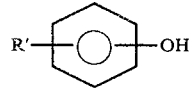

wherein R' is hydrogen or a linear or branched alkyl having from 1 to 8 carbon atoms.

2. A method as recited in claim 1 wherein the alkanol is a $C_2$ to $C_6$ alkanol.

3. A method as recited in claim 1 wherein R' contains from 1 to 6 carbon atoms.

4. A method as recited in claim 1 wherein the ratio of the concentration of alkanol to the concentration of phenol is from 0.1 to 5.

5. A method as recited in claim 1 wherein the ratio of the concentration of alkanol to the concentration of phenol is from 0.5 to 2.0.

6. A method as recited in claim 1 wherein the ratio of the total concentration of alkanol and phenol to the concentration of surfactant is from 0.1 to 10.

7. A method as recited in claim 1 wherein the ratio of the total concentration of alkanol and phenol to the concentration of surfactant is from 0.5 to 5.

8. A method as recited in claim 1 wherein the alkylpolyalkoxyalkylene sulfonate has the following formula:

$$R(OR')_n R''SO_3^- M^+$$

wherein R is an alkyl group having from 8 to 24 carbon atoms, R' is ethylene or a mixture of ethylene and higher molecular weight alkylene with relatively more ethylene than higher alkylene, R" is ethylene, propylene, hydroxy propylene or butylene, n is a number from 1 to 20, and M is sodium, potassium, lithium or ammonium.

9. A method as recited in claim 1 wherein the alkylarylpolyalkoxyalkylene sulfonate has the following formula:

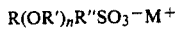

$$R(OR')_n R''SO_3^- M^+$$

wherein R is an alkylaryl group having from 6 to 20 carbon atoms in the alkyl chain, R' is ethylene or a mixture of ethylene and higher molecular weight alkylene with relatively more ethylene than alkylene, R" is ethylene, propylene, hydroxy propylene or butylene, n is a number from 1 to 20, and M is sodium, potassium, lithium or ammonium.

10. A method as recited in claim 1 wherein the surfactant fluid also contains an organic sulfonate.

11. A method as recited in claim 10 wherein the organic sulfonate is petroleum sulfonate whose average equivalent weight is from 300 to 500.

12. A method as recited in claim 1 wherein the fluid also contains a low HLB, water insoluble nonionic surfactant.

13. A method as recited in claim 1 wherein the ratio of alkanol to phenol is adjusted to cause the fluid to be birefringent.

14. A method as recited in claim 13 wherein the ratio and total concentration are adjusted to cause maximum birefringence in the fluid.

* * * * *